(12) United States Patent
Greiter

(10) Patent No.: US 6,478,704 B1
(45) Date of Patent: Nov. 12, 2002

(54) LINK CHAIN

(75) Inventor: Ivo Greiter, Grossmehring (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 0 days.

(21) Appl. No.: 09/657,471

(22) Filed: Sep. 7, 2000

(30) Foreign Application Priority Data

Sep. 9, 1999 (DE) .......................... 199 43 010

(51) Int. Cl.⁷ .................... F16G 13/02; F16G 13/04
(52) U.S. Cl. ...................... 474/229; 474/215
(58) Field of Search .................. 474/206, 214, 474/213, 229, 242, 28, 208, 245, 217, 230, 228, 226, 219, 207, 212, 240, 247

(56) References Cited

U.S. PATENT DOCUMENTS

| | | | |
|---|---|---|---|
| 953,114 A | * | 3/1910 | Belcher .................. 474/213 |
| 953,428 A | * | 3/1910 | Morse ..................... 474/229 |
| 3,344,761 A | | 10/1967 | Steuer |
| 4,449,960 A | * | 5/1984 | van der Lely ........ 474/215 X |
| 4,500,305 A | * | 2/1985 | Rattunde ................ 474/201 |
| 4,509,937 A | * | 4/1985 | Ledvina et al. .......... 474/213 |
| 4,547,182 A | | 10/1985 | Rattunde |
| 4,581,001 A | | 4/1986 | Rattunde et al. |
| 4,631,042 A | | 12/1986 | Rattunde |
| 4,642,079 A | * | 2/1987 | Horowitz et al. ...... 474/206 X |
| 4,710,154 A | | 12/1987 | Rattunde |
| 4,927,404 A | | 5/1990 | Rattunde |
| 5,427,583 A | | 6/1995 | Wolf |
| 5,562,557 A | * | 10/1996 | Ledvina et al. ............. 474/84 |
| 5,728,021 A | | 3/1998 | von Rooij et al. |
| 6,135,908 A | * | 10/2000 | Greiter .................. 474/212 X |

FOREIGN PATENT DOCUMENTS

| | | |
|---|---|---|
| DE | 38 26 809 C 1 | 8/1989 |
| DE | 19743676 A1 * | 4/1998 |
| DE | 696 00 141 T2 | 7/1998 |
| DE | 198 55 582 A 1 | 6/1999 |

* cited by examiner

*Primary Examiner*—David A. Bucci
*Assistant Examiner*—Marcus Charles
(74) *Attorney, Agent, or Firm*—Darby & Darby

(57) ABSTRACT

An endless link chain, particularly for use in a continuously variable transmission in the power train of a motor vehicle, has composite links and pintles which articulately connect neighboring links to each other. At least one of the links is assembled of at least two types of parallel plate-like components which differ from each other in size, shape, material and/or strength. The purpose of such selection of the plate-like components is to enhance one or more characteristics of the chain, for example, to reduce or eliminate vibration, to reduce the bulk and/or to properly position the pintles. The distribution of components in one or more links can be selected with a view to influence the above-enumerated and/or other characteristics, such as the resistance to deformation, of the chain.

45 Claims, 4 Drawing Sheets

LINK CHAIN

BACKGROUND OF THE INVENTION

The invention relates to improvements in endless flexible torque transmitting devices, and more particularly to improvements in so-called link chains (also known as pintle chains) which can be trained over and can transmit torque between driving and driven rotary parts, for example, over two or more adjustable pulleys or sheaves forming part of an infinitely or continuously variable transmission (CVT) in the power train of a motor vehicle.

A link chain of the above outlined character normally comprises a series of composite links each of which extends transversely of the chain and each of which can comprise a group or array of plate-like components. The components have openings for pintles which extend transversely of the chain and each of which articulately connects two successive links to each other so that the thus coupled links can pivot with respect to one another. Reference may be had, for example, to U.S. Pat. No. 5,427,583 (granted Jun. 27, 1995 to Wolf for "LOW-NOISE, TRIPLE SIDE BAR SPROCKET CHAIN FOR INFINITELY VARIABLE TRANSMISSION") and U.S. Pat. No. 4,927,404 (granted May 22, 1990 to Rattunde for "LINK CHAIN FOR AN INFINITELY VARIABLE CONE DRIVE DISK TRANSMISSION"). The disclosure of each and every US and foreign patent and patent application mentioned in the specification of the present application, as well as that of the commonly owned German priority application Serial No. 199 43 010.1 (filed Sep. 9, 1999), is incorporated herein by reference.

A feature of a continuously variable transmission (CVT) is that, at least within a certain range, it can be set to furnish any one of an infinite number of different speed ratios. For example, a CVT can be set to furnish any desired speed ratio between the output element (such as a crankshaft or a camshaft) of a prime mover (such as a combustion engine) of a motor vehicle and the axles of the front and/or rear wheels. This is accomplished by training an endless flexible element (such as a link chain or pintle chain) over a pair of adjustable pulleys each having an axially fixed and an axially adjustable conical flange. The ratio is changed by moving the adjustable flange of one pulley toward the adjacent coaxial axially fixed flange and by simultaneously moving the adjustable flange of the other pulley axially of and away from the respective axially fixed flange. The means for moving the axially movable or shiftable flanges relative to the respective axially fixed flanges often comprises fluid-operated (preferably hydraulic) cylinder and piston assemblies and a control unit which actuates the two assemblies simultaneously, i.e., one of the axially movable flanges moves toward while the other axially movable flange moves away from the associated axially fixed flange, or vice versa. Since the length of the link chain is fixed, the just described simultaneous adjustments of the two axially movable flanges necessarily result in a change of the transmission ratio as well as in uninterrupted transmission of torque in the course of the actual selection of a desired speed ratio.

German patent No. 696 00 141 T2 discloses a link chain wherein each link comprises several components and wherein neighboring links are articulately connected to each other by pintles each of which comprises a pair of elongated rocker elements. This chain has gained acceptance in the relevant industry. However, the patented chain exhibits certain drawbacks such as excessive vibration in actual use. Excessive vibration entails the generation of pronounced noise and adversely affects the reliability and safety of the CVT in actual use. Furthermore, the patented chain is rather bulky which limits its usefulness or necessitates extensive redesigning of parts which embody or cooperate with such transmission.

German patent No. 38 26 809 C1 discloses a modified link chain wherein the links employ components having different thicknesses (as measured transversely of the chain) and/or consisting of different materials. The purpose of such design is to account for the fact that the load upon the links varies as seen transversely of the chain. Thus, the load is normally higher at the marginal portions as well as at the central portion but is less in the regions between the central portion and the two marginal portions. The utilization of links having components of different thicknesses and/or being made of different materials is intended to compensate for the aforementioned variations of load. A drawback of the just described chain is that it also exhibits the tendency to carry out pronounced vibratory movements when in actual use; this adversely affects the smoothness of running as well as the safety of the CVT and results in the generation of excessive noise. In addition, the components of the composite links in the patented chain undergo pronounced deformation and/or exhibit other undesirable defects after a relatively short period of actual use.

German patent No. 198 55 582 A1 discloses a link chain wherein each link comprises several components, and pintles in the form of pairs of rocker elements serving to articulately connect neighboring links to each other. The end portions of the rocker elements of each pair are connected with safety devices in the form of clamps each of which contacts at least one selected rocker element. The purpose of the safety devices is to prevent axial displacements of the rocker elements transversely of the chain, i.e., in the longitudinal directions of the respective pairs of links. The safety devices are designed with a view to ensure reliable retention of the rocker elements against axial shifting, even in the event of stretching of the link chain. It has been ascertained that, though the just described patented link chain holds the rocker elements against axial shifting transversely of the chain, this chain still exhibits several drawbacks such as pronounced vibration in actual use and the afore-discussed undesirable consequences, e.g., the generation of noise, reduced stability and/or others.

OBJECTS OF THE INVENTION

An object of the invention is to provide a novel and improved link chain or pintle chain which is constructed and assembled in such a way that it is sturdier, safer, quieter and not bulkier than heretofore known chains.

Another object of the invention is to provide a simple and inexpensive link chain which can be utilized in existing continuously variable transmissions as a superior substitute for presently known and utilized link chains.

A further object of the present invention is to provide a link chain which comprises simple and inexpensive parts and which can be assembled in a time-saving manner.

An additional object of the instant invention is to provide novel and improved links for use in the above outlined chain.

Still another object of the invention is to provide novel and improved pintles for use in the above outlined link chain.

A further object of the invention is to provide a novel and improved method of making the constituents of and of assembling links for use in a chain of the above outlined character.

Another object of the invention is to provide a continuously variable transmission employing the above outlined link chain as a means for transmitting torque between adjustable pulleys.

An additional object of the invention is to provide a power train which embodies the improved transmission and can be utilized with advantage in motor vehicles and/or for other purposes.

SUMMARY OF THE INVENTION

One feature of the invention resides in the provision of an elongated chain, such as an endless chain which can be utilized with advantage in a continuously variable transmission (CVT), e.g., in the power train of a motor vehicle. The improved chain comprises a series of successive adjacent links each of which extends transversely of the chain whereas the series extends longitudinally (lengthwise) of the chain. Each link includes a group of neighboring substantially plate-like components each having a first side and a second side. The components of each group include outer components and intermediate components, and each side of each intermediate component is adjacent a side of one of the respective neighboring components. At least one of the groups (but preferably at least two groups, for example, each group) includes a first set of components and a second set of components; in accordance with a feature of the invention, the sides of the first set of components are different from the sides of the second set of components. The improved chain further comprises elongated pintles each of which extends transversely of the chain and each of which articulately connects two adjacent links to each other.

When the chain is in actual use, e.g., in a continuously variable transmission wherein it is trained over at least two adjustable pulleys each having a fixed conical flange and an axially movable conical flange, the end faces of the pintles are or can be configurated to frictionally engage the conical surfaces of the flanges.

Each component of each group (i.e., of each link) is provided with at least one opening which extends between the first and second sides of the respective component. The openings of the components of each link are in at least partial register (overlap) with the openings of components of an adjacent link, and each pintle extends through the registering openings of the components forming part of the respective adjacent or neighboring links.

Each pintle can comprise a plurality (e.g., a pair) of elongated sections (often called rocker elements) which contact each other. Each rocker element of each pair of rocker elements is in contact with one set of components of one link and with one set of components of the other link of the respective adjacent links, i.e., of those links which are articulately connected to each other by the pintle embodying the respective rocker elements. Such chain can further comprise suitable connectors which non-rotatably secure at least one rocker element of each pintle with one of the respective (adjacent) links. The connectors in such chain can constitute form-locking connectors.

The rocker elements of each pintle or of certain pintles can be mounted in such a way that they are movable longitudinally of the respective links, i.e., transversely of the chain.

Each group of plate-like components (i.e., each link) can comprise at least one first and at least one second outer component, and such first and second outer components flank the respective intermediate components. The pintles of such chain can be installed in such a way that each of their rocker elements is movable longitudinally beyond the first as well as beyond the second outer components of the respective links (i.e., of the links which are articulately connected to each other by the respective pintle.

The rocker elements of each pintle (or of certain pintles) can be installed in such a way that they are movable relative to each other; for example, the rocker elements of one or more pintles can roll relative to and while in contact with each other. The arrangement can be such that the movements of rocker elements of one or more pintles relative to each other (while such rocker elements bear upon each other) can entail a pivoting of the respective links with reference to one another.

The at least one group of components can include the aforementioned first and second sets of components as well as at least one third component, and such third component can be provided with means for opposing or preventing movements of at least one rocker element of the respective pintle relative to at least one of the corresponding links (i.e., relative to the link which includes the at least one group of components and/or relative to one of the links which are articulately connected with such link.

Each group can include at least one first and at least one second outer component, and such first and second outer components flank the respective intermediate components. The at least one third component of at least one group of components can be arranged to oppose longitudinal movements of the aforementioned at least one rocker element from the first outer component of the respective first and second outer components in at least one angular position of the link which includes the at least one group relative to the link wich is articulately connected to the at least one group of components by the pintle embodying the at least one rocker element.

The sides of the at least one third component are or can be different from the sides of the components of the first and/or second set.

The at least one group can include one or two third components.

The intermediate components of one or more groups can include at least one component of the first set and/or at least one component of the second set; for example, each intermediate component can constitute a component of the first or second set. Alternatively, the at least one group can include at least three components of the first set and at least three components of the second set.

The aforementioned openings of the components can be configured and dimensioned, and the rocker elements of the pintles can be mounted in the respective openings in such a way that at least one rocker element of a properly installed pintle contacts the components of the first set at a single location in the opening of each of the first set of components.

The components of the first set can be provided with means for limiting or preventing movements of the respective pintle relative to the first set of components longitudinally of the chain. For example, the openings can be elongated as seen in the longitudinal direction of the chain and the limiting means can include projections which are configurated and distributed in such a way that they oppose movements of pintles lengthwise of the respective openings. Furthermore, such projections can serve to prevent movements of rocker elements forming part of pintles away from each other. Since each opening normally receives portions of two pintles, the projections can be arranged to hold each of the two pintles in the respective opening against sidewise movement longitudinally of the opening, i.e., longitudinally of the chain.

The projections can extend directly into the openings of the respective components. Still further, the projections can be designed to hold the rocker elements of pintles in the respective openings against movement away from each other (as seen longitudinally of the chain).

It is also within the purview of the invention to provide at least one component of at least one of the sets with means for limiting movements of at least a portion of the respective link relative to at least a portion of an adjacent link. The limiting means can be designed to limit pivotal movements of adjacent (articulately connected) links relative to each other. For example, the limiting means can comprise at least one external protuberance on the at least one component of the at least one set. The at least one protuberance can extend longitudinally of the chain. Furthermore, the at least one component of the at least one set can be provided with two external protuberances; one such protuberance extends longitudinally of the chain in a first direction and the other protuberance also extends longitudinally of the chain but in a second direction counter to the first direction.

If the at least one group of components further includes a third set of components, the components of all three sets can extend lengthwise of the chain and each such set can include at least two neighboring components.

In accordance with a presently preferred embodiment, the outer components of each group (i.e., of each link) can include spaced-apart first and second subgroups or assemblies each of which is composed of at least two neighboring components, and the intermediate components of each such group can include a third assembly which is composed of at least two neighboring components identical with the components of the first and second assemblies. The intermediate components of each such group further include a fourth assembly of at least two neighboring components between the first and third assemblies and a fifth assembly of at least two neighboring components between the second and third assemblies. The first, second and third assemblies constitute the components of one of the first and second sets, and the components of the fourth and fifth assemblies constitute the components of the other of the first and second sets.

The just described presently preferred embodiment can be modified in such a way that each of the five assemblies can be replaced with a unit embodying one or more components. For example, at least one of these units can comprise at least two substantially plate-like components.

In accordance with a further modification, the outer components of the at least one group form part of one of the first and second sets of components and include first and second assemblies of at least two components each; these first and second assemblies flank the intermediate components of the at least one group.

Alternatively, the outer components of the at least one group can form part of one of the sets and the intermediate components of the at least one group include at least one component of the other set.

The intermediate components of the at least one group can include an assembly of components forming part of one of the sets and being located at least substantially midway between the first and second outer components of the at least one group.

In accordance with still another modification, the outer components of the at least one group include at least one first and at least one second outer component, and such first and second outer components flank the intermediate components of the at least one group. At least one intermediate component and the first and second outer components of the at least one group form part of one of the first and second sets of components, and the intermediate components of the at least one group further comprise at least one first component forming part of the other of the first and second sets of components and being disposed between one of the first and second outer components and the at least one intermediate component. The intermediate components further include at least one second component which is identical with the first component and is disposed between the at least one intermediate component and the other of the first and second outer components.

At least one first component of the at least one group (e.g., of each group) can consist (at least in part) of a first material, and at least one second component of the at least one group can consist (at least in part) of a second material which is different from the first material. It is also possible to make one or more components of the first set of a first material and to make one or more components of the second set, in their entirety, of a second material other than the first material.

The components of the first set can have a first length (as seen longitudinally of the chain), and the components of the second set can have a second length which is different from the first length.

Still further, the components of the first set can have a first strength (stability), and the components of the second set can have a second strength which is different from the first strength.

The components of at least one of the first and second sets can include means for guiding the pintles, and the components of the other of such sets can be constructed and assembled to at least reduce the tendency of the chain to vibrate in actual use.

The components of at least one of the sets can consist of a material which undergoes elastic and/or plastic deformation in response to longitudinal stretching of the chain. Alternatively, all components can be made of a material which permits such components to undergo elastic deformation but enables the components to resist plastic deformation during stretching of the chain in actual use, e.g., in a continuously variable transmission.

Another feature of the present invention resides in the provision of a continuously variable transmission which comprises a first adjustable rotary pulley or sheave, a second adjustable rotary pulley or sheave, and an endless chain which is trained over the pulleys and is constructed and assembled in the following way:

The chain comprises a series of successive adjacent links each of which extends transversely of the chain. The series of links extends longitudinally of the chain, and each link includes a group of neighboring substantially plate-like components each having a first side and a second side. The components of each group are distributed in such a way that each such group includes outer components and intermediate components and that each side of each intermediate component is adjacent a side of one of the respective neighboring components. At least one of the groups includes a first set of components and a second set of components, and the sides of the first set of components are different from the sides of the second set of components. The chain further comprises pintles each of which extends transversely of the chain and articulately connects two adjacent links to each other.

The novel features which are considered as characteristic of the invention are set forth in particular in appended claims. The improved chain itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
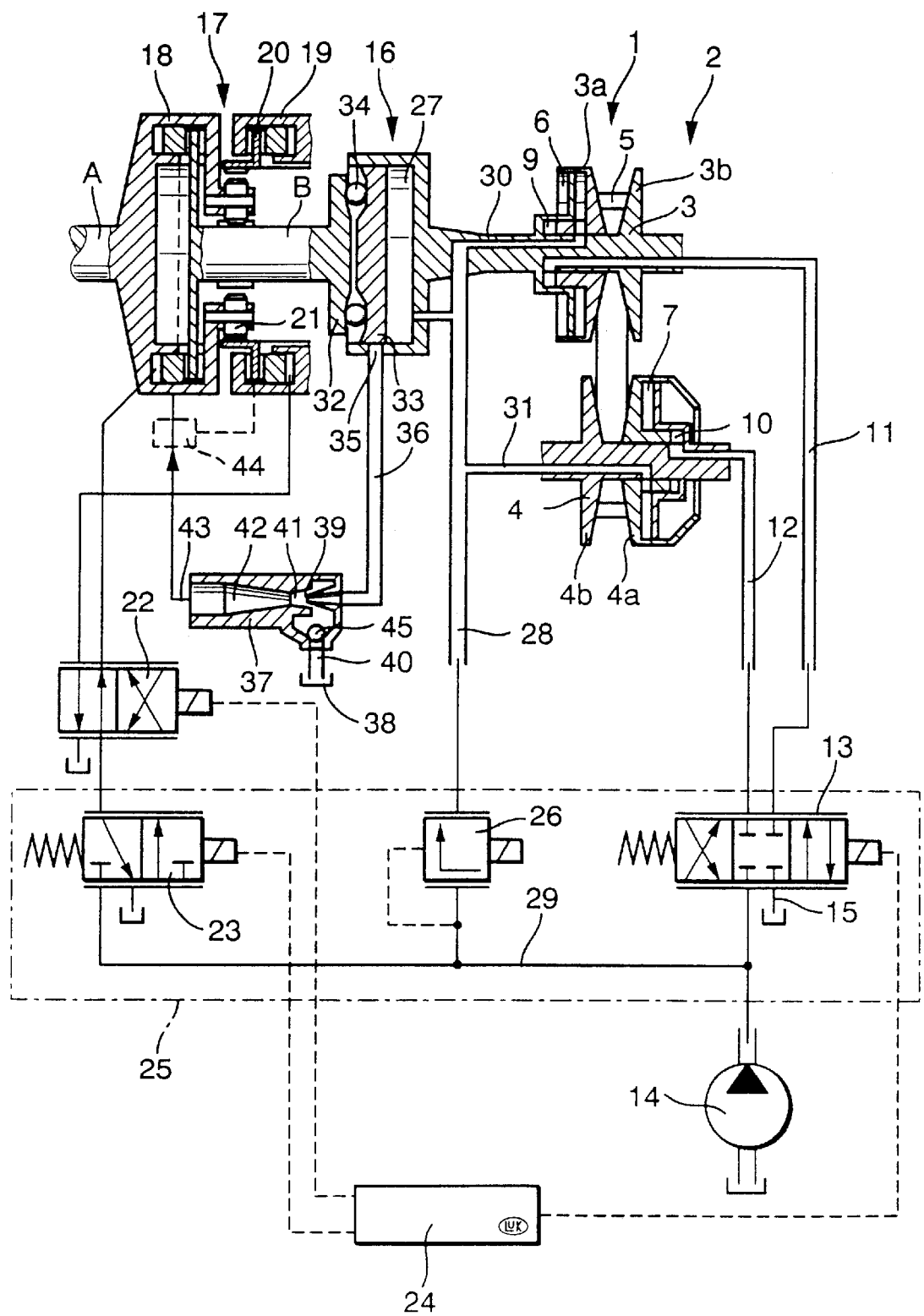
FIG. 1 is a diagrammatic partly elevational and partly sectional view of a power train which can be utilized in a motor vehicle and employs a continuously variable transmission with an endless link chain adapted to be constructed and assembled in accordance with the present invention.

FIG. 1 shows certain details of a power train 1 which can be utilized in a motor vehicle to transmit torque between a prime mover (such as a combustion engine or a hybrid including a motor and an engine) and the front and/or rear wheels. The power train 1 includes a continuously variable transmission (CVT) 2 including a driving pinion or sheave 3, a driven pinion or sheave 4 and an endless flexible element 5 (namely a link chain or a pintle chain) which is constructed and assembled in accordance with the present invention.

The pulley 3 comprises an axially fixed conical flange 3b and an axially movable (adjustable) conical flange 3a. Analogously, the driven pulley 4 comprises an axially fixed conical flange 4b, and an axially movable conical flange 4a. The chain 5 has arcuate portions trained over the two pulleys, i.e., one of such arcuate portions is disposed between the flanges 3a, 3b and the other arcuate portion is disposed between the flanges 4a, 4b.

A first adjusting unit 6 serves to move the flange 3a axially toward and away from the flange 3b, i.e., to respectively increase and reduce the radius of that arcuate portion of the chain 5 which is trained over the pulley 3. The unit 6 normally comprises (or can comprise) a fluid-operated (preferably hydraulic) cylinder and piston assembly. A similar or identical adjusting unit 7 is provided to move the flange 4a toward and away from the flange 4b, i.e., to increase or reduce the radius of that arcuate portion of the chain 5 which is trained over the pulley 4. The arrangement is such that the flange 3a automatically moves toward the flange 3b when the flange 4a moves away from the flange 4b, and vice versa.

The adjusting units 6, 7 respectively operate in parallel with two additional adjusting units 9, 10 which preferably constitute hydraulically operated cylinder and piston assemblies and serve to select and vary the ratio of the transmission 2. The plenum chamber of the adjusting unit 9 receives pressurized hydraulic fluid from a source 14 when the plenum chamber of the adjusting unit 10 is free to discharge fluid into a sump 15, and vice versa. The connection between the source 14 (such as a suitable pump) and the plenum chambers of the adjusting units 9, 10 comprises a regulating valve 13 having an inlet port connected with the outlet of the pump 14 and two outlet/inlet ports connected with conduits 11, 12 which are respectively connected with the adjusting units 9 and 10. A further port of the regulating valve 13 is connected with the sump 15.

The mode of operation of the adjusting units 9 and 10 is such that the ratio of the transmission 2 is a function of the differential of fluid pressures in the plenum chambers of these units.

The power train 1 further comprises a hydromechanical torque sensor 16 which serves as a means for selecting a fluid pressure in dependency upon the magnitude of transmitted torque. To this end, the torque sensor 16 is set up to transmit at least a fraction of the torque being supplied by an intermediate shaft B to the pulley 3. The intermediate shaft B can receive torque from an input shaft A (e.g., a camshaft or a crankshaft of a combustion engine) by way of a clutch assembly 17.

The assembly 17 comprises a starter clutch 18 and, if necessary, a direction of rotation reversing clutch 19. The latter preferably comprises a brake or a clutch 20 which can reverse the direction of rotation of the intermediate shaft B by way of a planetary transmission 21.

The clutches 18 and 19 are hydraulically operated clutches which can be selectively engaged and disengaged by way of a switchover valve 22. The latter is controlled by a regulating valve 23, i.e., the valve 23 induces the valve 22 to engage the clutch 18 or 19 and to simultaneously disengage the other of these clutches. At least the valves 13, 22 and 23 can be assembled into a valve block 25 and can receive appropriate signals from the corresponding outputs of a central electronic control circuit 24. The input or inputs (not shown) of the control circuit 24 receive signals denoting various operational parameters of the prime mover (such as the aforementioned combustion engine) which drives the shaft A and/or of the motor vehicle and/or of the transmission 2.

A pressure regulating valve 26 receives pressurized fluid from the outlet of the pump 14 by way of a conduit 29 and selectively admits fluid into a conduit 28. The purpose of the valve 26 is to ensure that, even when the fluid pressure furnished by the torque sensor 16 is low, the pressure in the conduit 29 leading to the valve 23 is maintained above a predetermined threshold value, i.e., that a certain pressure prevails at the inlet ports of the regulating valves 13 and 23.

The plenum chamber 27 of the torque sensor 16 can communicate with the outlet of the pump 14 by way of the conduits 28, 29; the conduit 28 communicates with conduits 30, 31 which, in turn, communicate with the plenum chambers of the adjusting units 6 and 7. Thus, the fluid pressure in the chambers of the adjusting units 6, 7 is maintained at a level which is a function of the pressure selected by the torque sensor 16. The latter constitutes a torque-regulated valve which transmits torque from the intermediate shaft B to the common shaft of the flanges 3a, 3b forming part of the driving pulley 3.

More specifically, the illustrated torque sensor or valve 16 comprises an axially fixed cam disc 32, an axially movable cam disc 33 and one or more spherical rolling elements 34 contacting the confronting sloping surfaces or ramps of the two cam discs. The outlet 35 of the torque sensor 16 discharges fluid into a conduit or channel 36 which discharges the fluid into a jet pump 37. The effective area of the outlet 35 is variable by the axially movable cam disc 33, i.e., as a function of the magnitude of the torque being transmitted by the sensor 16 to the driving pulley 3. Thus, the magnitude of torque being transmitted by the sensor 16 determines the pressure of hydraulic fluid in the plenum chamber 27, in the conduits 28, 30, 31, and hence also in the plenum chambers of the adjusting units 6, 7.

The pressure of fluid (such as oil) leaving the plenum chamber 27 via outlet 35 is relatively high, i.e., the energy of such fluid is also high. The energy of fluid flowing into the jet pump 37 via conduit 36 and nozzle 39 is utilized to draw additional fluid from a source 38 (which can form part of or include the source 15) by way of a suction line 40. In other words, fluid entering the jet pump 37 via nozzle 39 serves as a propellant in that it induces the jet pump to draw fluid from the source 38 and to convey such fluid into a conduit 43. The nozzle 39 has a convergent conical outlet or orifice 41. The fluid which is discharged into the conduit 43 can be utilized to lubricate and/or cool one or more constituents of the power train 1.

The orifice 41 of the nozzle. 39 discharges fluid at a high speed and at a greatly reduced pressure which establishes the necessary circumstances for withdrawal of fluid from the source 38 (such as a sump) via suction line 40 and into a diffusor 42 of the jet pump 37. The diffusor 42 is located downstream of the orifice 41 of the nozzle 39 and upstream of the conduit 43; this diffusor serves to select the desired pressure of fluid entering the conduit 43.

The conduit 43 discharges fluid into a chamber of the starter clutch 18; such fluid serves to cool and/or to lubricate the clutch 18. It is advisable to employ a further valve 44 which is installed in the conduit 43 and is or can be identical with or a functional equivalent of the valve 22. The purpose of the valve 44 is to connect the jet pump 37 with the clutch 18 or 19; this valve receives signals from the control circuit 24.

A certain percentage of fluid (normally oil) issuing from the jet pump 37 can be utilized to lubricate the transmission 2. Furthermore, the conduit 43 and/or 36 can discharge fluid into one or more branch conduits (not shown) containing one or more flow restrictors (throttles) and serving to convey one or more flows of coolant and/or lubricant to certain additional part(s) of the illustrated power train 1 and/or to other parts of the motor vehicle embodying such power train.

The jet pump 37 contains or cooperates with a check valve 45 which is set up to permit fluid to flow from the source 38 into the body of this pump but not in the opposite direction. An important function of the check valve 45 is to ensure that, when the fluid entering the jet pump 37 is cold (i.e., when the viscosity of such fluid is high), it cannot escape from the body of the jet pump back into the source 38. When the temperature in the surrounding atmosphere is low or extremely low, losses in the jet pump 37 and/or in the conduits and/or branch conduits receiving very cool fluid can increase to a value at which the jet pump is incapable of drawing additional fluid from the source 38. Furthermore, extremely low temperatures (i.e., high viscosity of fluid in the conduit 36) can exert an adverse influence upon the operation of the jet pump 37. Under such circumstances, the check valve 45 ensures that the jet pump 37 is capable of conveying to the conduit 43 at least that fluid which is being delivered by the conduit 36.

The prime mover 1 of FIG. 1 is practically identical with that shown in the single Figure of commonly owned U.S. Pat. No. 5,667,448 granted Sep. 16, 1997 to Friedmann for "POWER TRAIN". The sole difference is that the link chain or pintle chain 5 shown in the aforedescribed FIG. 1 of this application is constructed and assembled in accordance with any one of several embodiments of the present invention.

The exact details of the torque sensor 16 and of the adjusting units 6, 7 and 9, 10 form no part of the present invention. Reference may be had, for example, to commonly owned U.S. Pat. No. 5,046,991 (granted Sep. 10, 1991 to Friedmann for "CONTINUOUSLY VARIABLE SPEED TRANSMISSION"), U.S. Pat. No. 5,169,365 (granted Dec. 8, 1992 to Friedmann for "POWER TRAIN"), U.S. Pat. No. 5,295,915 (granted Mar. 22, 1994 to Friedmann for "CONTINUOUSLY VARIABLE SPEED TRANSMISSION") and U.S. Pat. No. 5,711,730 (granted Jan. 27, 1998 to Friedmann et al. for "TORQUE MONITORING APPARATUS").

Figure 2A:
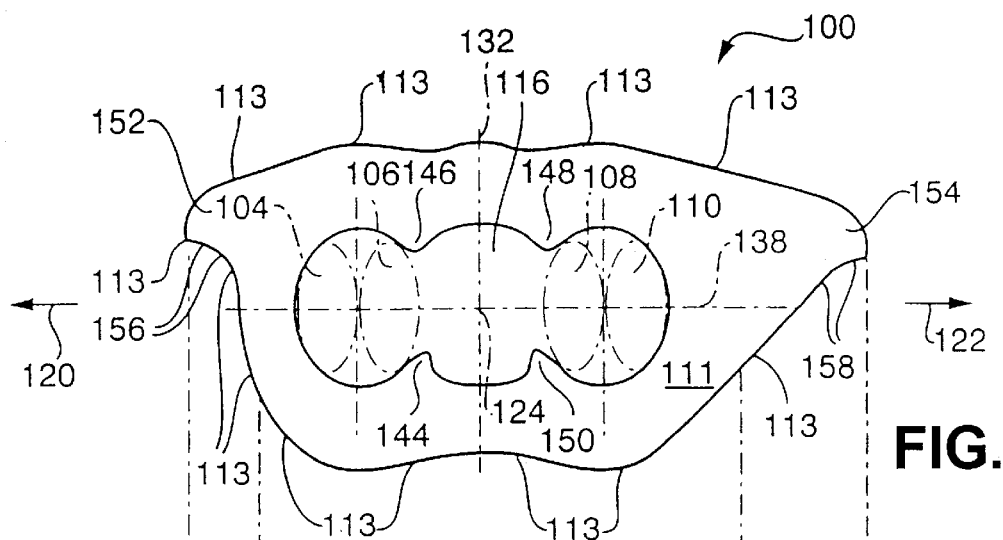
FIG. 2 illustrates two different plate-like components of a composite link which can be utilized in the improved chain, with a first plate-like component shown in FIG. 2a and a second plate-like component shown in FIG. 2b.
Figure 2B:
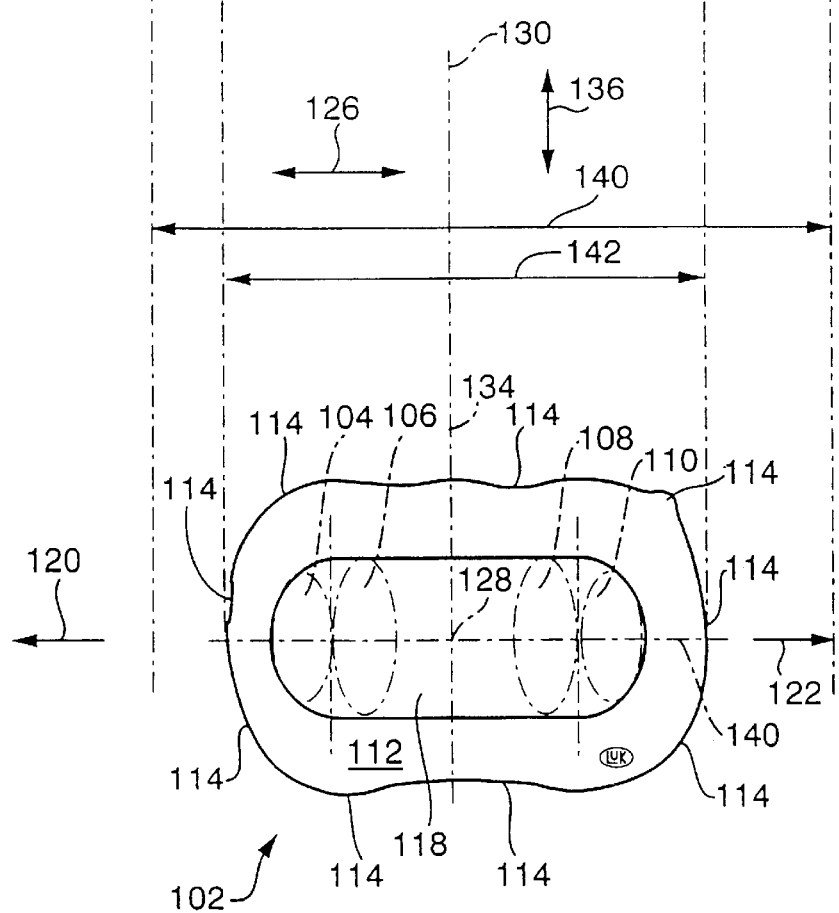

FIG. 2 shows a first plate-like component 100 and a second plate-like component 102 of a composite chain link which forms part of a link chain or pintle chain 170 (see FIG. 3) embodying one form of the present invention. The component 100 is designed (at least in part) to guide two pintles of the chain 170, namely a first composite pintle including two elongated rocker elements 104, 106 and a second composite pintle including two elongated rocker elements 108, 110. In addition, the component 100 serves as a means for limiting the extent of rearward pivoting or swinging of the composite link which normally includes several components 100 as well as several components 102.

Figure 3:
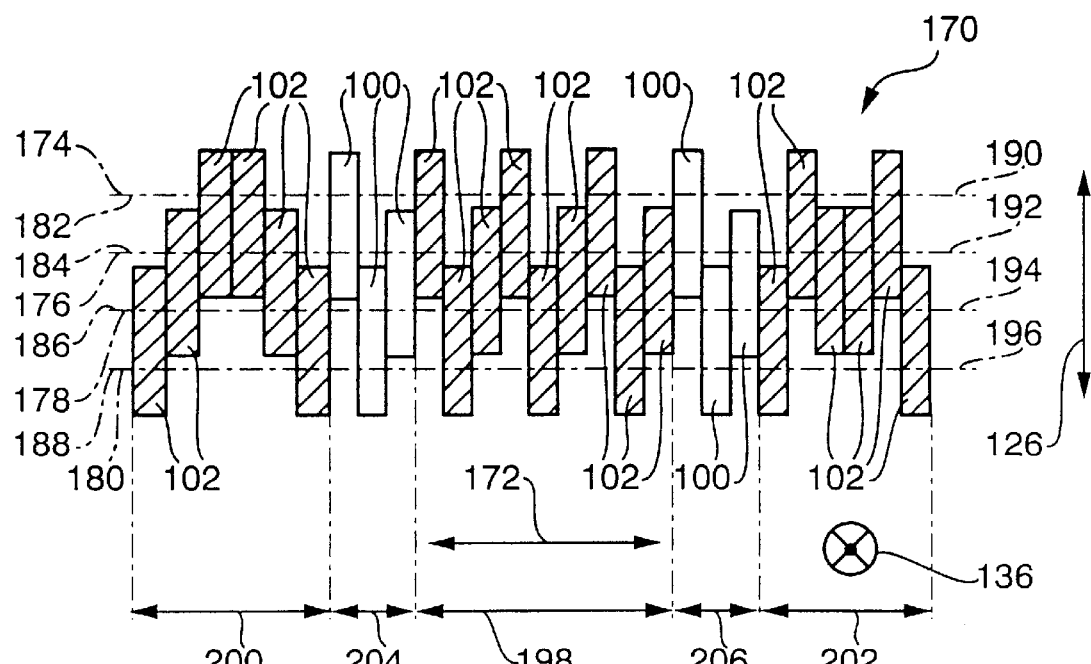
FIG. 3 is an elevational view of a composite link which employs plate-like components of the type shown in FIG. 2.

The second component 102 of FIG. 2 is designed to exhibit an optimum strength. This second component has two parallel sides or side faces 112 which are different from the parallel sides or side faces 111 of the first component 100. More specifically, the outline 113 of the component 100 is different from the outline 114 of the component 102. For example, the length (indicated by the double-headed arrow 140) of the first component 100 exceeds the length (note the double-headed arrow 142) of the component 102. In the embodiment of FIGS. 2 and 3, the length of the second component 102 is close to 70% of the length of the first component 100.

The first component 100 has a single opening 116 which extends all the way between its sides 111, and the second component 102 has a single opening 118 which also extends all the way between its sides 112; thus, in the embodiment of FIGS. 2 and 3, the number of openings (116) in the component 100 matches the number of openings (118) in the component 102.

The composite pintle including the rocker elements 104, 106 articulately (pivotably) connects the link including several components 100 as well as several components 102 (e.g., in a distribution as shown in FIG. 3) with a first adjacent or neighboring link, and the composite pintle including the rocker elements 108, 110 articulately (pivotably) connects the composite link of FIG. 3 with a second adjacent or neighboring link of the chain 170.

The rocker elements 104, 110 are non-rotatably connected with the components 100, 102 of FIG. 2, preferably by resorting to form-locking connector means. The rocker element 106 is form-lockingly and non-rotatably connected to at least some plate-like components of a chain link which is adjacent (at 120) to the link including the components of FIG. 2. The rocker element 108 is form-lockingly and non-rotatably connected to at least some plate-like components of a chain link which is adjacent (at 122) the link including the components of FIG. 2.

The rocker elements 104, 106 can roll relative to each other, the same as the rocker elements 108, 110. Thus, the chain link including the plate-like components 100, 102 of FIG. 2 can pivot relative to the link (arrow 120) which is adjacent the left-hand sides of the components 100, 102 of FIG. 2 as well as relative to the other adjacent link (arrow 122).

The sides 111, 112 of the components 100, 102 are plane (non-profiled) surfaces. The center of area (also called center of figure) 124 of the component 100 corresponds essentially to the center of area 128 of the component 112 (as seen in the longitudinal direction (arrow 126) of these components). This is indicated by the dot-dash line 130 which includes the centers 124 and 128. The double-headed arrow 136 denotes the direction of height, and such direction is parallel to the axes 132, 134 of the respective elements 100, 102. The aforementioned double-headed arrow 126 extends in the longitudinal direction of the chain 170 and is parallel to the longitudinal axes 138, 140 of the respective components 100, 102. The just outlined orientation of the axes 132, 134 and 138, 140 is the reason for the aforediscussed relationship of the centers of area 124, 128. The axes 132, 134 are located in a first symmetry plane of the openings 116, 118, and the axes 138, 140 are located in a second symmetry plane of such openings; the two symmetry planes are normal to each other.

The rocker elements 104, 106 of the left-hand pintle of FIG. 2 are held against sidewise movement relative to the components 100, 102 (i.e., in the directions indicated by the arrows 120, 122), namely such rocking elements are held against movement out of the left-hand end portions of the openings 116, 118. Analogously, the rocker elements 108, 110 of the right-hand pintle of FIG. 2 are held against movement out of the respective end portions of the openings 116, 118 (namely in directions indicated by the double headed arrow 126). The components 100, 102 hold the rocker element 104 against movement relative to such components in the direction of arrows 120, and these components also hold the rocker element 110 against movement relative to such components in the direction of arrow 122. The component 102 does not comprise any means for holding the rocker elements 104, 106 against movement in the direction of arrows 122 and/or for holding the rocker elements 108, 110 against movement relative to the components 100, 102 in the direction of the arrows 120. However, the component 100 is provided with a first pair of internal projections 144, 146 which are designed to hold the rocker elements 104, 106 against movement (relative to the component 100) in the direction of arrows 122 (i.e., toward the rocker elements 108, 110). Furthermore, the component 100 has internal projections 148, 150 which hold the rocker elements 108, 110 against movement (relative to the component 100) in the direction indicated by the arrows 120.

The illustrated projections 144, 146 and 148, 150 have rounded apices and concave surfaces abutting and guiding the respective rocker elements 106, 108 for angular movement relative to the component 100 and relative to the adjacent rocker elements 104, 110, respectively.

The component 100 is further provided with two external projections or protuberances 152, 154 which respectively extend from the major portion of this component in directions of the arrows 120 and 122, i.e., longitudinally of the chain 170 (as indicated by the arrow 126). Furthermore, the protuberances 152, 154 are located at one side of the symmetry plane including the axis 138, namely at the outer side of the chain 170. The concave undersides or inner sides 156, 158 of the respective protuberances 152, 154 can abut the protuberances of a component 100 forming part of an adjacent composite link (not shown) to limit the extent of pivoting of the two links relative to each other in one of the two (clockwise and counterclockwise) directions. For example, the arrangement can be such that neighboring composite links of the chain 170 can pivot relative to each other in one direction from neutral positions in which such links form part of a flat or straight section of the chain but the protuberances 152, 154 prevent or limit the extent of pivotal movement of such neighboring composite links from the neutral positions in the opposite direction.

The protuberances 152, 154 of the component 100 shown in FIG. 2 are not exact mirror images of each other with reference to the plane including the centers of area 124, 128 and are both located at one side of the other symmetry plane including the axis 138.

FIG. 3 shows a composite link including a total of twentyseven plate-like components, namely six components 100 and twentyone components 102. These components include two outer sets or arrays (in the regions or zones 200, 202) of six components 102 each, a central set or array (in the central or median region 198) of nine components 102, and two sets or arrays (in the regions 204, 206) of three components 100 each. The arrays in the regions 204 and 206 are respectively flanked by the arrays in the regions 200, 198 and 198, 202. The composite link of FIG. 3 extends transversely (see the double-headed arrow 172) of the chain 170, and the planes of the components 100, 102 extend in the longitudinal direction (indicated by the double-headed arrow 126) of this chain. The double-headed arrow 136 points in the direction of height of the composite link.

The dot-dash lines 174, 176, 178 denote the pivot axes of several composite links, i.e., each such pivot axis is defined by a discrete pintle. The arrangement is such that two neighboring pintles are coupled to each other by a plurality of (twentyone) components 102 (which, as already pointed out hereinbefore, are designed to enhance the stability of the chain 170) as well as by a plurality of (six) components 100. As also mentioned hereinbefore, the components 100 are or can be designed to ensure optimal guidance of the links as well as to limit the extent of pivoting of pairs of adjacent links relative to each other in one of the two (clockwise and counterclockwise) directions.

The feature that a composite link (or at least one composite link of the improved chain) is assembled of two different types of plate-like components constitutes but one of several embodiments of the invention. For example, at least one of the links can be assembled of at least three groups of plate-like components which differ from each other in size and/or shape and/or weight and/or material. Furthermore, and referring again to FIG. 3, the marginal zones 182, 190 of the link including the pintle 174, the marginal zones 184, 192 of the link denoted by the pintle 176, the marginal zones 186, 194 of the link denoted by the pintle 178 and/or the marginal zones 188, 196 denoted by the pintle 180 can include specially designed plate-like safety members or components which are dimensioned and/or configurated and/or made of a material such that a stretching of the chain 170 merely involves an elastic but no plastic (or no appreciable plastic) deformation of the safety members. To this end, the configuration and/or other characteristics of the safety members may depart from the corresponding parameters of the components 100 and/or 102.

FIG. 3 shows that the illustrated composite link of the chain 170 comprises sets or arrays of identical components 100 (namely those in the regions or zones 204 and 206) which alternate with sets or arrays of identical components 102 (namely in the regions or zones 200, 198 and 202). As already explained hereinbefore, the components 102 are designed to exhibit a pronounced strength (resistance to permanent (plastic) deformation) and preferably also a pronounced resistance to elastic deformation; therefore, the groups of components 102 are provided in the central region or zone 198 as well as in the two marginal regions or zones 200 and 202 of the illustrated composite link.

The width of the central region or zone 198 (as measured longitudinally of the link shown in FIG. 3, i.e., transversely of the chain 170) exceeds the width of the other regions or zones 200, 204, 206, 202 of such link (it is assumed here that the thickness of a component 100 equals or approximates the thickness of a component 102). The width of the region 198 can be three times the width of the region 204 or 206, and the width of each of the regions 200 and 202 can be twice the width of the region 204 or 206.

It goes without saying that one or more links of the improved chain 170 can include the same number of components 100 and/or 102 as that of such components in the link. shown in FIG. 3 but in a slightly or greatly different distribution. For example, the number of regions or zones which contain components 100 (see the regions 204 and 206 in FIG. 3) can exceed two, and the number of regions (see the regions 200, 198 and 202 of FIG. 3) can exceed or can be less than three. Moreover, the number of components 102 in the central region 198 can depart from nine, the number of components 100 in the region 204 and/or 206 can depart from three, and/or the number of components 102 in the marginal region 200 and/or 202 can depart from six.

Figure 4:
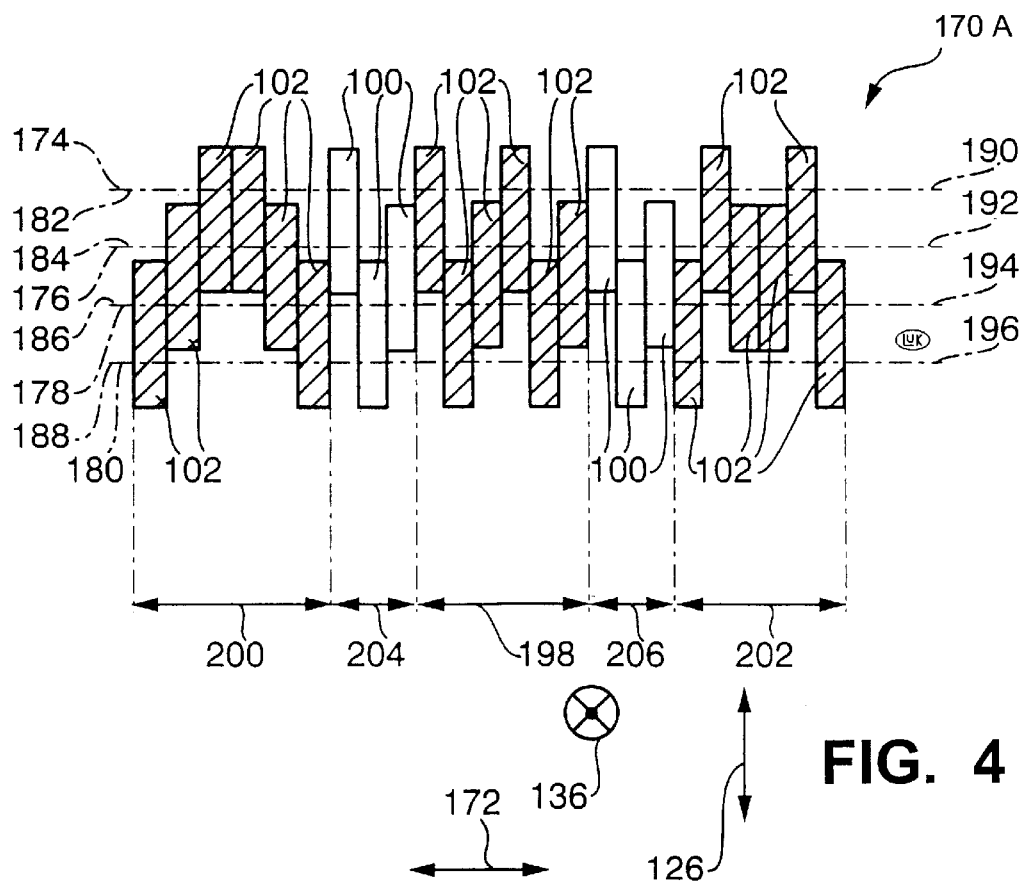
FIG. 4 is a similar elevational view of a composite link which differs from the link of FIG. 2 in that it embodies a different number of plate-like components of the type shown in FIG. 2.

The composite link which is shown in FIG. 4 differs from the link of FIG. 3 in that the number of plate-like components 102 in the central zone or region 198 equals six, i.e., the same as the number of components 102 in the marginal regions or zones 200, 202. The number of plate-like components 100 in the regions or zones 204, 206 shown in FIG. 4 is the same as in the similarly referenced regions or zones shown in FIG. 3. Since the thicknesses of the plate-like components 100, 102 in the link of FIG. 3 are the same as the thicknesses of such components in the link of FIG. 4, the length of the link forming part of the chain 170 (FIG. 3) exceeds that of the link forming part of the chain 170A (FIG. 4).

Figure 5:
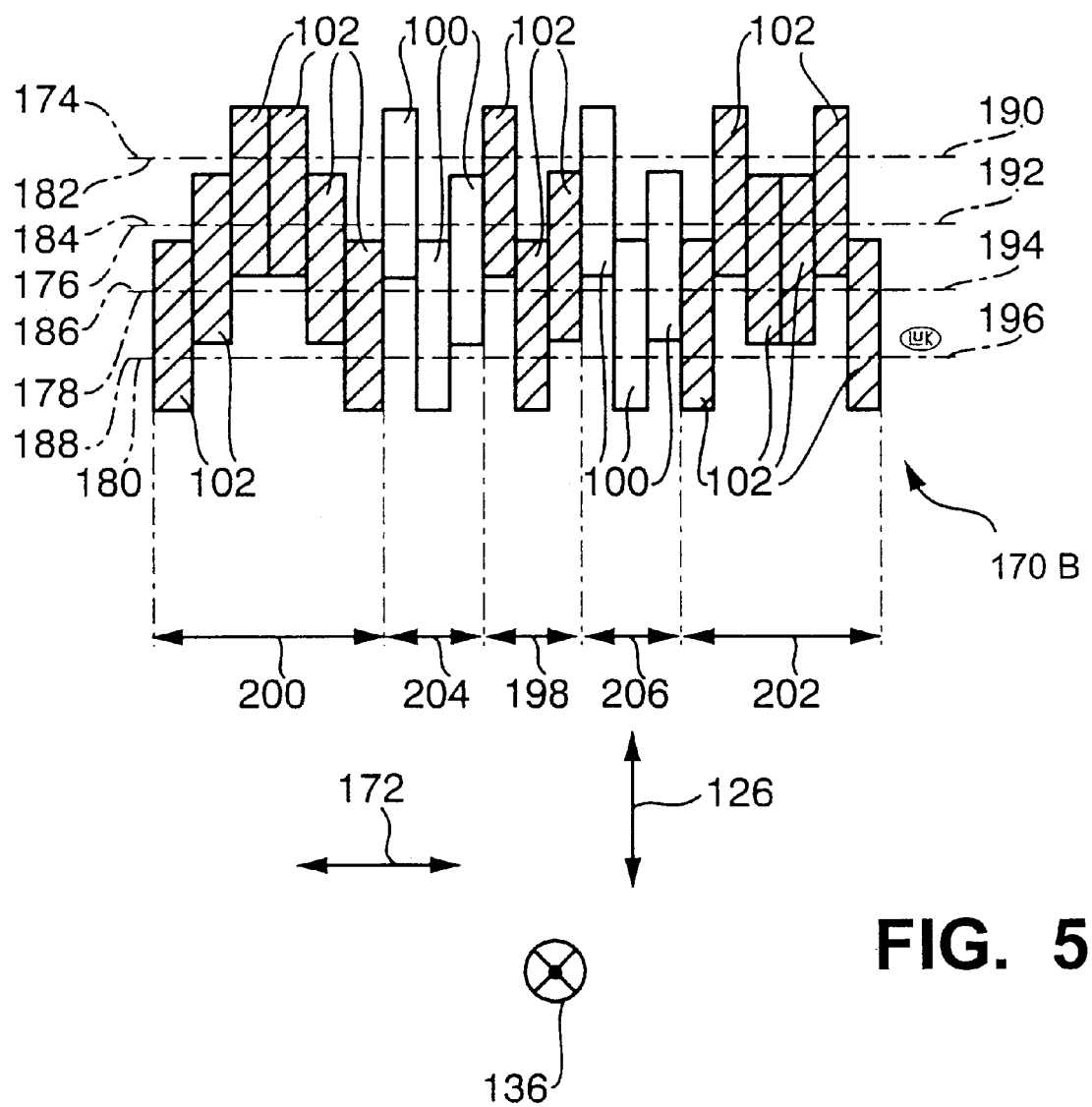
FIG. 5 is a similar elevational view of a composite link wherein the number of plate-like components differs from the number of such components in the link of FIG. 3 or 4.

FIG. 5 shows one composite link of a third chain 170B. This link is shorter than the link which is shown in FIG. 3 or 4 because the median region or zone 198 comprises only three plate-like components 102. The number of components in each of the regions or zones 200, 204, 206, 202 shown in FIG. 5 is the same as that in the similarly referenced regions or zones in the link shown in FIG. 3 or 4. In FIG. 5, the thicknesses of the components 100 match those of the components 102.

It is often preferred to construct and assemble the improved link chain (e.g., the chain 170, 170A and/or 170B) in such a way that each of its composite links employs two or more different types of plate-like components (such as the components 100, 102 shown in FIG. 2). The main difference between the components 100, 102 is that between their geometries (surface shapes), i.e., between the sides 111 of the component 100 and the sides 112 of the component 102. In this specification, the term "geometry" is intended to denote the configurations (shapes) and/or the sizes and/or the contours (peripheral surfaces 113, 114) and/or the lengths (142, 140) and/or heights (see the arrow 136) of the components 100 and 102.

An important advantage of a link chain or pintle chain which embodies composite links of the type shown, for example, in FIG. 3 is that the utilization of at least two different types of plate-like components (100, 102) reduces the tendency of the chain to vibrate and contributes to compactness (i.e., to a reduction of space requirements) as well as to the stability (strength) of the link chain. Moreover, by being in a position to assemble the links of two or more different types of plate-like components, the designer or assembler can accumulate different types of components into two or more groups or arrays wherein the number and/or the nature and/or the positions of different components exert an optimum influence upon a particular parameter of the respective link and/or the entire chain. For example, and as already mentioned hereinbefore, the components 102 can be assembled into groups or arrays 198, 200 and 202 which constitute the median portion and the marginal portions of the respective link (namely the portions which are most likely to be subjected to pronounced stresses acting in the longitudinal direction of the chain) because the components 102 are designed with a view to stand relatively high or very high tensional (deforming) stresses (in the directions indicated by the double-headed arrow 126). Otherwise stated, the geometry of each plate-like component 102 can be specifically selected in a manner to enhance the ability of such component to resist permanent deformation and preferably also at least some elastic deformation. On the other hand, the geometry of each component 100 can be selected to ensure that such component enhances certain other important characteristics of the link chain, proper retention of the pairs of rocker elements (composite pintles) 104, 106 and 108, 110 as well as or the resistance to excessive pivoting of the composite link relative to a neighboring link in one of the two (clockwise and counterclockwise) directions.

Another important advantage of composite links which are assembled of at least two different types of plate-like components (such as 100 and 102) is that neither the components 100 nor the components 102 must be designed to enhance all or a majority of important characteristics. Thus, the components 102 need not be designed to properly confine the composite pintles and/or to exhibit a relatively high elasticity because such tasks are performed and such characteristics are exhibited by the components 100. One of the reasons for the desirability of such distribution of tasks and/or characteristics of a composite link is that the components 100 and/or 102 need not perform two or more contradictory functions (such as the ability to undergo pronounced elastic deformation as well as the ability to withstand any or any, appreciable plastic and/or elastic deformation. It was ascertained that the utilization of composite links which perform different functions often contributes to a reduction of the weight of such links and/or of the entire chain.

It is within the purview of the present invention to construct and assemble the improved link chain in such a way that at least one of its links comprises at least two, three, four, five, six or seven (or even more different) plate-like components; the components can differ from each other in the geometries of their sides. Furthermore, at least one of the links can be assembled in such a way that it preferably comprises at least one component but not more than two components of each type. For example, at least one composite link can comprise at least four different types of substantially plate-like components(e.g., components having different sides) including a single component of at least two of such four different types. It is also possible to assemble at least one composite link of the improved chain in such a way that it comprises two outermost groups or arrays (such as at 200, 202) of components (such as 102) of one type and one or more intermediate groups or arrays (such as at 204, 198, 206) including components of at least one other type. The two or more types can differ from each other at least in the configuration of their sides.

The number of different components in each composite link of the improved chain may but need to be the same. Furthermore, and as shown in FIGS. 3, 4 and 5, at least one of each and every composite link of the improved chain can comprise two, three or more components of each of two or more different types of such components. It is also within the purview of the present invention to employ at least one profiled and/or at least one non-profiled component within one, some or all of its composite links.

In accordance with a further modification which is not shown in the drawings, at least one of the composite links can comprise components of at least two different types in that the number of openings in components of one type departs from the number of openings in at least one other type of components. Furthermore, the configurations and/or locations of openings in plate-like components of a first type can depart from the configurations and/or locations of other types of openings in plate-like components of at least one other type.

The aforementioned connector means (such as form-locking connector means) which hold the rocker elements of the composite pintles against movement transversely of the chain can be designed to perform such holding functions as well as to prevent movements of the outermost components (such as those forming the groups in the regions or zones 200 and 202) against movement longitudinally of the respective link (i.e., in directions indicated by the arrow 126). The connector means can form part of or they can constitute the two outermost components of a link (such as the leftmost component 102 of the group or array in the region 200 and the rightmost component of the group in the region 202 shown in FIG. 3), or they can constitute separately produced parts other than the components 100 and 102. The connector means can be form-lockingly or force-lockingly or frictionally connected with the adjacent components 100 and 102 and/or with the adjacent end portions of the pintles including the rocker elements 104, 106 or 108, 110. In many or most instances, the connector means are designed to undergo at least a certain amount of elastic deformation but to be capable to withstand plastic (permanent) deformation. In other words, the connector means can undergo temporary deformation in response to a stretching of the chain but can reassume their original shapes when the stretching of the chain is terminated or lessened or interrupted.

Regardless of the presence or absence of discrete connector means, at least one link of the improved chain (such as 170) preferably comprises at least one component (such as 100) of a first type and at least one component (such as 102) of a second type. The geometry of the at least one component 100 departs from that of the at least one component 102. In many instances, such a link further comprises, at the very least, at least one component of a third type and at least one component of a fourth type. At least the geometries of the sides of components of the third and fourth types preferably depart from each other as well as from the geometries of the sides 111, 112 of the components 100 and 102, or one of the components 100 and 102.

In accordance with one presently preferred embodiment which constitutes a further modification of the composite link shown in FIG. 3, 4 or 5, the regions or zones 200 and 202 each accommodate two components which can be said to constitute safety members, and such pairs of safety members flank a plurality of intermediate (central) components including at least two different types of components (such as 100 and 102). Thus, the intermediate components include at least two components having sides (such as 111, 112) with different geometries, i.e., such sides differ from each other in at least one respect such as their areas and/or outlines and/or lengths and/or heights. The composite link which includes pairs of safety members need not include any additional safety member(s) between the two pairs of safety members in the regions 200 and 202. It often suffices if only one of each pair of components in the regions 200, 202 constitutes a safety member. Furthermore, the intermediate component(s) of such composite link can be supported by but need not be connected to the respective pair(s) of rocker elements. The just described composite link can constitute a single link of such nature or one of several links in a chain; in fact, each link can be constructed and assembled in the just described manner.

It is often preferred to construct and assemble the improved link chain in such a way that it comprises two or more different types of composite links, e.g., two or more links of the character shown in FIG. 3, 4 or 5. Each such link is composed of at least two different types of plate-like components. The intermediate components of the composite links need not be affixed to the respective pintles, i.e., they can be installed in the chain in such a way that, in the absence of any undertakings or means to prevent sliding and/or other movements of the intermediate links relative to the corresponding pintle or pintles, the intermediate components could be pushed or pulled off the one or the other axial end of the respective pintle.

In accordance with another presently preferred embodiment, at least one composite link of the improved chain comprises at least two groups of different components, and each such group can comprise at least three neighboring components having identical profiles. With reference to FIG. 3, this would amount to deletion of the components 100, 102 in the regions 198, 206, 202 and to deletion of three components 102 from the region 200.

A desirable feature of each of the composite links shown in FIGS. 3, 4 and 5 is that it comprises at least three components 100 and at least three components 102, as well as that at least one rocker element (106, 108) of each pair (104, 106 and 108, 110) of each composite pintle is in minimal contact with the components 102. This can be seen in the lower part of FIG. 2. It will be noted that the rocker elements 106, 108 have minimal contact with those components (102) which are designed to enhance the stability, particularly the resistance to excessive stretching, of the chain.

On the other hand, the components 100 are configured in such a way that they positively oppose sidewise movements of all rocker elements 104, 106 and 108, 110 (i.e., of both pintles extending through an opening 116) in either of the directions indicated by the double-headed arrow 126. This is due to the provision of the projections 144, 146 and 148, 150 which are configured and positioned to respectively hold the pairs of rocker elements 104, 106 and 108, 110 against sidewise movement out of the respective end portions of the openings 116. It is also within the purview of the invention to replace the opening 116 of each plate-like component 100 with two discrete openings, one for the rocker elements 104, 106 and the other for the rocker elements 108, 110. In accordance with still another modification, each component 102 can be provided with pairs of projections corresponding to those shown at 144, 146 and 148, 150 so that such modified component 102 is also capable of holding the rocker elements 106, 108 against sidewise movement toward each other, i.e., away from the associated rocker elements 104 and 110.

The projections 144, 146 and 148, 150 can serve as a means for confining the pairs of rocker elements 104, 106 and 108, 110 in the respective end portions of the openings 116, 118 as well as a means for guiding the neighboring rocker elements 106, 108. Since the primary functions (or at least the two important functions) of the components 100 are to confine the two pintles in selected portions of the openings 116, 118 and/or to guide the respective pintles 104, 106 and 108, 110, it is not necessary to make the components 100 as sturdy as the components 102 which perform the important function of enhancing the stability of the respective chain. Moreover, and as shown in each of FIGS. 3, 4 and 5, the components 100 can be installed in those regions or zones (204, 206) of the chain (as seen transversely of the chain) wherein the chain is subjected to less pronounced tensional stresses.

The composite links which are shown in FIGS. 3, 4 and 5 can be modified by replacing one or two components 100 in the region 204 and/or 206 with a modified component which is devoid of projections 144, 146, 148, 150 and/or protuberances 152, 154. In other words, the number of components (100) which can block sidewise movements of the rocker elements 106, 108 away from the associated rocker elements 104, 110 can be reduced, the same as the number of components (100) which are designed to limit the extent of pivotal movement of the composite link (in one direction) relative to an adjacent link.

The protuberances 152, 154 and/or the projections 144, 146, 148, 150 can be of one piece with the respective component 100; alternatively, such protuberances and/or projections can be welded and/or otherwise reliably secured to the correspondingly simplified components replacing the illustrated components 100. The protuberances 152, 154 are put to use when the direction of movement of the chain is reversed, e.g., when a link is about to engage the flanges 3a, 3b or 4a, 4b of the pulley 3 or 4 or when such link is in the process of moving away from frictional engagement with the flanges. Another circumstance when the protuberances 152, 154 are likely to become effective is when the chain comprising one or more composite links is caused to perform pronounced vibratory or oscillatory movements for any one of a plurality of different reasons including the movement of a link from a straight into an arcuate portion of its path or vice versa.

The protuberances 152, 154 or their equivalents are highly effective in reducing the amplitude of vibrations of the improved link chain. This, in turn, contributes to a reduction, or prevention of the generation, of noise as well as to a smoother movement of the chain. The protuberances 152, 154 of the component 100 shown in the upper part of FIG. 2 engage the rocker elements 104, 106 or 108, 110 of the adjacent pintles at least when the link including such component assumes a predetermined angular position with reference to the adjacent link. Such selection of the configurations and positions of the protuberances 152, 154 enhances the stability of the link chain and entails a pronounced reduction of noise when the link chain is in motion; all this is accomplished in that the protuberances cooperate with the adjacent pintles to limit the extent of vibratory movements of the links because the protuberances engage the adjacent link as soon as two neighboring links tend to pivot relative to each other beyond the mutual angular positions they assume when the corresponding portion of the chain is straight. Otherwise stated, the protuberances become effective when the median pintle of three neighboring pintles moves into the common plane of the other two pintles; the protuberances 152, 154 then become effective to prevent the movement of such median pintle beyond the common plane of the other two pintles. The protuberances 152, 154 of the component 100 can but need not be mirror images of each other with reference to the plane including the axes 132, 134 shown in FIG. 2.

The material of the components 100 can be different from that of the components 102. In many instances, the components 100, 102 can constitute shaped parts which are stamped out of sheets made of a metallic, plastic or other suitable material. The thickness of sheet material of the components 100 may but need not always be different from the thickness of sheet material of the components 102. In many instances, the thickness of the components 100 matches or approximates the thickness of the components 102. The same applies for the aforementioned connector means and safety members, i.e., their thicknesses may but need not be identical with those of the components 100 and/or 102.

FIGS. 3 and 4 show composite links each of which consists of two halves which are mirror images of each other with reference to a plane extending midway across the region or zone 198. In FIG. 5, such plane halves the median component 102 in the region 198. However, it is equally possible to assemble links of components which are not necessarily arranged in accordance with a predetermined regular pattern. Resort to a predetermined regular pattern is preferred in many instances because this renders it possible to more accurately determine, in advance, the behavior of the chain under various circumstances of use.

In accordance with certain additional modifications, the number of components 102 in the regions or zones 200 and 202 can be reduced to five, four, three, two or even one. It is also possible to employ in each of the regions 200 and 202 one or more components 102 and one or more additional components exhibiting characteristics (such as strength) departing from those of the components 100 or 102. For example, the width of each of the regions or zones 200 and 202 can equal n∈N wherein n is the number of components and N is an element of the quantity of natural numbers 1, 2, 3, 4, etc.

The number of components 102 in the median or central region 198 can vary from one to nine or more. The presently preferred numbers of components 102 in the region 198 are shown in FIGS. 3, 4 and 5. Still further, the number of alternating components 100, 102 can increase from one longitudinal end to the other longitudinal end of the respective link or vice versa, or such number can increase from the median region 198 toward and inclusive of the outer regions 200, 202. It is even possible to utilize at least two different types of plate-like components in random distribution all the way from one to the other end of a composite link. For example, such a link (or any other link which forms part of a chain embodying the present invention) can have three or more different types of components.

Still further, it is possible to employ, for example, first and second plate-like components which are identical in every respect except that they are made of different metallic or other materials and/or that they exhibit different thicknesses and/or that they exhibit different elasticities and/or different plasticities. As a rule, the extent of plastic deformation is small or negligible.

Applicant is aware of the disclosures of U.S. Pat. No. 3,344,761 (Steuer), U.S. Pat. No. 4,547,182 (Rattunde), U.S.

Pat. No. 4,581,001 (Rattunde et al.), U.S. Pat. No. 4,631,042 (Rattunde), U.S. Pat. No. 4,710,154 (Rattunde), U.S. Pat. No. 4,927,404 (Rattunde), U.S. Pat. No. 5,427,583 (Wolf) and U.S. Pat. No. 5,728,021 (von Rooij et al.); these patents disclose various types of link chains for use in cone pulley transmissions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. An elongated chain, comprising:
    a series of successive adjacent links each extending transversely of the chain, said series extending longitudinally of the chain and each link including a group of neighboring plate components each having two opposite sides including a first and a second side, the components of each group including outer components and intermediate components and each side of each intermediate component being adjacent a side of one of the respective neighboring components, at least one of said groups including a first set of said neighboring plate components and a second set of said plate-like components, the sides of said first set of components being different from the sides of said second set of components; and
    pintles each extending transversely of the chain and each articulately connecting two adjacent links to each other,
    wherein said at least one group further comprises at least one third component, at least one of said pintles comprising a plurality of elongated rocker elements and said at least one third component having means for at least opposing movements of at least one of said rocker elements relative to at least one of the respective links.

2. The chain of claim 1, wherein several links include said first and second sets of components.

3. The chain of claim 1, wherein said pintles have end faces configured to frictionally engage conical surfaces of flanges forming part of adjustable pulleys.

4. The chain of claim 1, wherein at least one of said pintles comprises a plurality of elongated rocker elements movable longitudinally of the respective links.

5. The chain of claim 1, wherein at least one of said pintles comprises at least two elongated rocker elements movable relative to each other.

6. The chain of claim 1, wherein at least one of said pintles includes at least two elongated rocker elements which bear upon and are movable relative to each other to thus pivot the respective links with reference to one another.

7. The chain of claim 1, wherein each of said groups includes at least one first and at least one second outer component, said first and second outer components flanking the respective intermediate components and said at least one third component being arranged to oppose longitudinal movements of said at least one rocker element away from the first of the respective first and second outer components in at least one angular position of the link including said at least one group relative to the link which is articulately connected to said at least one group of components by said at least one pintle.

8. The chain of claim 1, wherein said at least one third component has sides which differ from the sides of the components of at least one of said first and second sets.

9. The chain of claim 1, wherein said at least one group includes at most two third components.

10. The chain of claim 1, wherein said at least one group comprises at least three components of each of said first and second sets.

11. The chain of claim 1, wherein each of said components has an opening and at least one of said pintles has a plurality of elongated rocker elements, at least one rocker element of said plurality contacting the components of said first set at a single location in the opening of each of said first set of components.

12. The chain of claim 1, wherein each of said components has an opening for at least one of said pintles, the components of said first set having means for at least limiting the movements of the respective pintle relative to said first set of components longitudinally of the chain.

13. The chain of claim 1, wherein each of said components has at least one opening extending between the first and second sides of the respective component, the openings of the components of each of said links being in at least partial register with the openings of components of an adjacent link and each of said pintles extending through the registering openings of the respective adjacent links.

14. The chain of claim 13, wherein each of said pintles comprises a pair of elongated rocker elements in contact with each other.

15. The chain of claim 14, wherein each rocker element of each pair is in contact with one set of components of one link and with one set of components of the other link of the respective adjacent links.

16. The chain of claim 14, further comprising connectors non-rotatably securing at least one rocker element of each of said pintles with one of the respective adjacent links.

17. The chain of claim 1, wherein said intermediate components include at least one component of said first set and at least one component of said second set.

18. The chain of claim 17, wherein each of said intermediate components is a component of at least one of said first and second sets.

19. The chain of claim 1, wherein said components have elongated openings extending longitudinally of the chain and each of said pintles extends through the openings of components forming part of two adjacent links of said series of successive links, the components of said first set having projections arranged to oppose movements of pintles lengthwise of the respective openings.

20. The chain of claim 19, wherein each of said pintles comprises a pair of abutting elongated rocker elements and said projections are positioned to hold the rocker elements of the respective pair against movement away from each other.

21. The chain of claim 19, wherein each of said openings receives two pintles and said projections are arranged to hold each of said two pintles against sidewise movement longitudinally of the openings.

22. The chain of claim 19, wherein said projections extend into the openings of the respective components.

23. The chain of claim 19, wherein said pintles include pairs of elongated rocker elements and said projections are positioned to hold the rocker elements of a pintle extending through said openings against movement away from each other as seen longitudinally of the chain.

24. An elongated chain, comprising:
    a series of successive adjacent links each extending transversely of the chain, said series extending longitudinally of the chain and each link including a group of neighboring plate components each having two opposite sides including a first and a second side, the components of each group including outer components and intermediate components and each side of each intermediate component being adjacent a side of one of the respective neighboring components, at least one of said groups including a first set of said neighboring plate components and a second set of said neighboring plate components, the sides of said first set of components being different from the sides of said second set of components; and pintles each extending transversely of the chain and each articulately connecting two adjacent links to each other, wherein al least one component of at least one of said sets includes means for limiting movement of at least a portion of the respective link relative to at least a portion of an adjacent link.

25. The chain of claim 24, wherein said limiting means includes means for limiting pivotal movements.

26. The chain of claim 24, wherein said limiting means, comprises two external protuberances on said at least one component of said at least one set, one of said protuberances extending longitudinally of the chain in a first direction and the other of said protuberances extending longitudinally of the chain in a second direction counter to said first direction.

27. The chain of claim 24, wherein said at least one group further includes a third set of components, the components of said sets extending lenghtwise of the chain and each of said sets including at least two neighboring components.

28. The chain of claim 24, wherein said outer components include spaced-apart first and second assemblies each composed of at least two neighboring components and said intermediate components include a third assembly composed of at least two neighboring components identical with the components of said first and second assemblies, said intermediate components further including a fourth assembly of at least two neighboring components between said first and third assemblies and a fifth assembly of at least two neighboring components between said second and third assemblies, the components of said first, second and third assemblies constituting the components of one of said sets and the components of said fourth and fifth assemblies constituting the components of the other of said sets.

29. The chain of claim 24, wherein the outer components of said at least one group form part of one of said first and second sets and include first and second assemblies of at least two components each, said first and second assemblies flanking the intermediate components of said at least one group.

30. The chain of claim 24, wherein said outer components of said at least one group form part of one of said sets and said intermediate components of said at least one group include at least one- component of the other of said sets.

31. The chain of claim 24, wherein said intermediate components of said at least one group include an assembly of components forming part of one of said sets and being located at least substantially midway between the outer components of said at least one group.

32. The chain of claim 24, wherein the outer components of said at least one group include at least one first and at least one second outer component, said first and second outer components flanking the intermediate components of said at least one group, at least one intermediate component and the first and second outer components of said at least one group forming part of one of said sets and the intermediate components of said at least one group further comprising at least one first component forming part of the other of said sets and disposed between one of said first and second outer components and said at least one intermediate component, and at least one second component identical with said first component and disposed between said at least one intermediate component and the other of said first and second outer components.

33. The chain of claim 24, wherein at least one first component of said at least one group consists, at least in part, of a first material and at least one second component of said at least one group consists, at least in part, of a second material different from said first material.

34. The chain of claim 24, wherein the components of said first set consist of a first material and the components of said second set consist of a second material different from said first material.

35. The chain of claim 24, wherein the components of said first set have a first length, as seen longitudinally of the chain, and the components of said second set have a second length different from said first length.

36. The chain of claim 24, wherein the components of said first set have a first strength, and the components of said second set have a second strength different from said first strength.

37. The chain of claim 24, wherein the components of at least one of said sets include means for guiding said pintles.

38. The chain of claim 24, wherein the components of at least one of said sets are constructed and assembled to at least reduce the tendency of the chain to vibrate in actual use.

39. The chain of claim 24, wherein the components of at least one of said sets consist of a material which undergoes at least plastic deformation in response to longitudinal stretching of the chain.

40. The chain of claim 24, wherein the components of at least one of said sets consist of a material which undergoes at least elastic deformation in response to longitudinal stretching of the chain.

41. The chain of claim 24, wherein said limiting means comprises at least one external protuberance on said at least one component of said at least one set.

42. The chain of claim 41, wherein said at least one protuberance extends longitudinally of the chain.

43. The claim of claim 24, wherein said outer components include first and second units each composed of at least one component and said intermediate components include a third unit composed of at least one component identical with the components of said first and second units, said intermediate components further including a fourth unit having at least one component between said first and third units and a fifth unit having at least one component between said second and third units, the components of said first, second and third units constituting the components of one of said sets and the components of said fourth and fifth units constituting the components of the said sets.

44. The chain of claim 43, wherein at least one of said units comprises at least two neighboring plate components.

45. A continuously variable transmission, comprising:

a first adjustable rotary pulley;

a second adjustable rotary pulley; and an endless chain trained over said pulleys, said chain comprising:

a series of successive adjacent links each extending transversely of the chain, said series extending longitudinally of the chain and each link including a group of neighboring plate components each having two opposite sides including a first and a second side, the components of each group including outer components and intermediate components and each side of each intermediate component being adjacent a side of one of the respective neighboring components, at least one of said groups including a first set of said neighboring plate components and a second set of said neighboring plate components, the sides of said first set of components being different from the sides of said second set of components; and pintles each extending transversely of the chain and each articulately connecting two adjacent links to each other, wherein said at least one group further comprises at least one third component, at least one of said pintles comprising a plurality of elongated rocker elements and said at least one third component having means for at least opposing movements of at least one of said rocker elements relative to at least one of the respective links.

* * * * *